Aug. 15, 1939.  A. L. DE LEEUW  2,169,761
CHANGE SPEED MECHANISM FOR MACHINE TOOLS
Filed Nov. 20, 1936  3 Sheets-Sheet 1
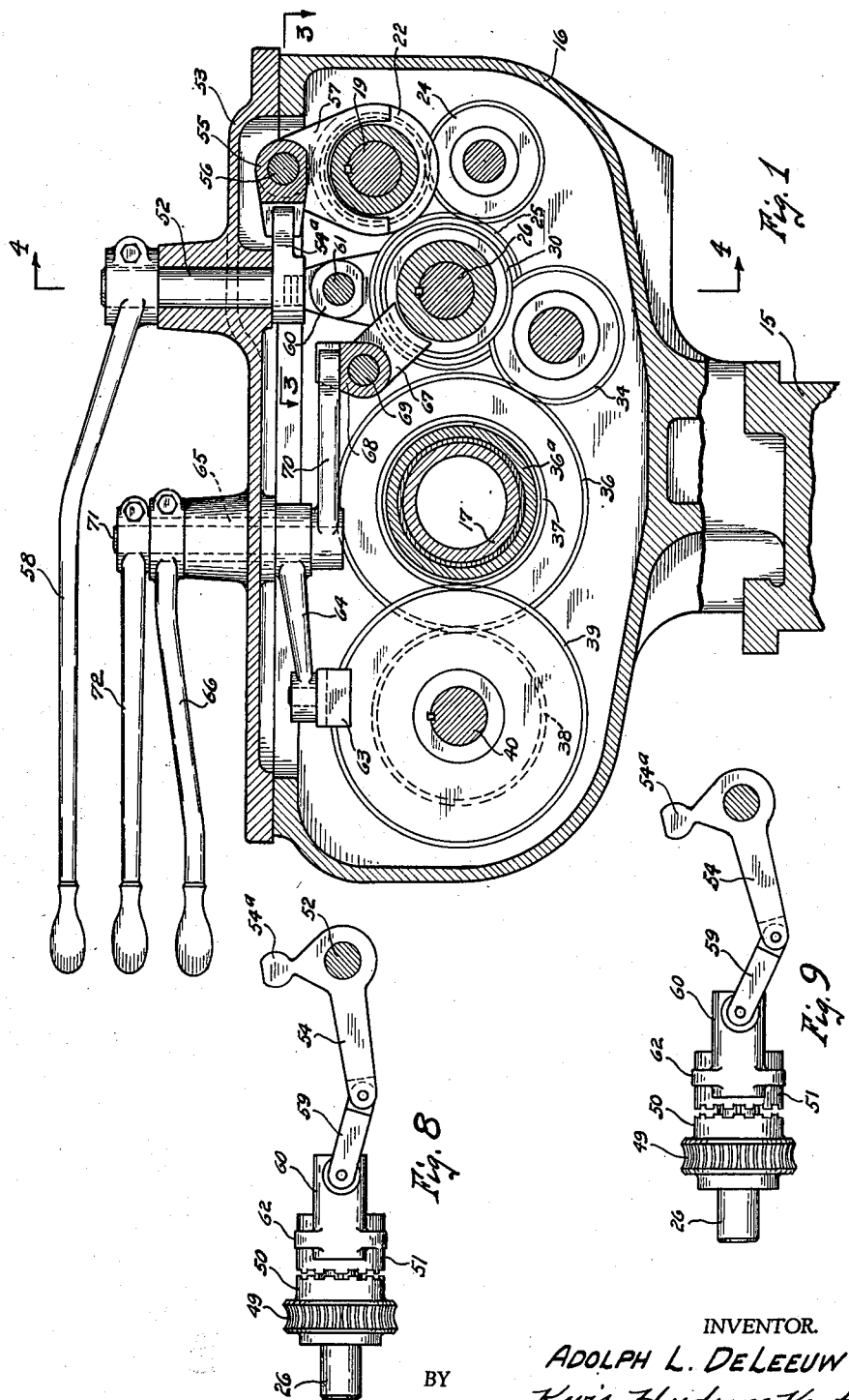
INVENTOR.
ADOLPH L. DE LEEUW
BY Kwis Hudson & Kent
ATTORNEYS

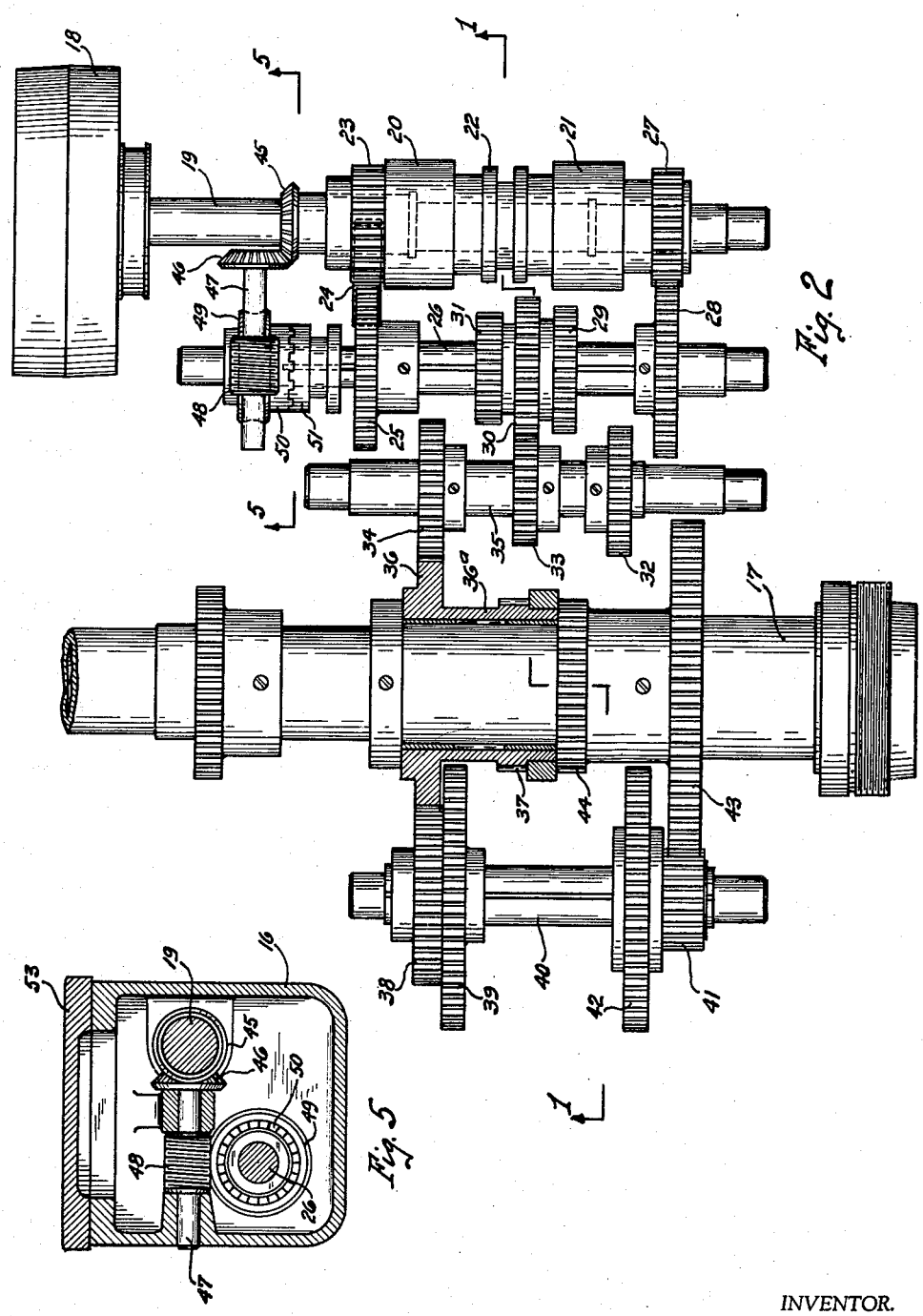

Aug. 15, 1939.  A. L. DE LEEUW  2,169,761
CHANGE SPEED MECHANISM FOR MACHINE TOOLS
Filed Nov. 20, 1936  3 Sheets-Sheet 3
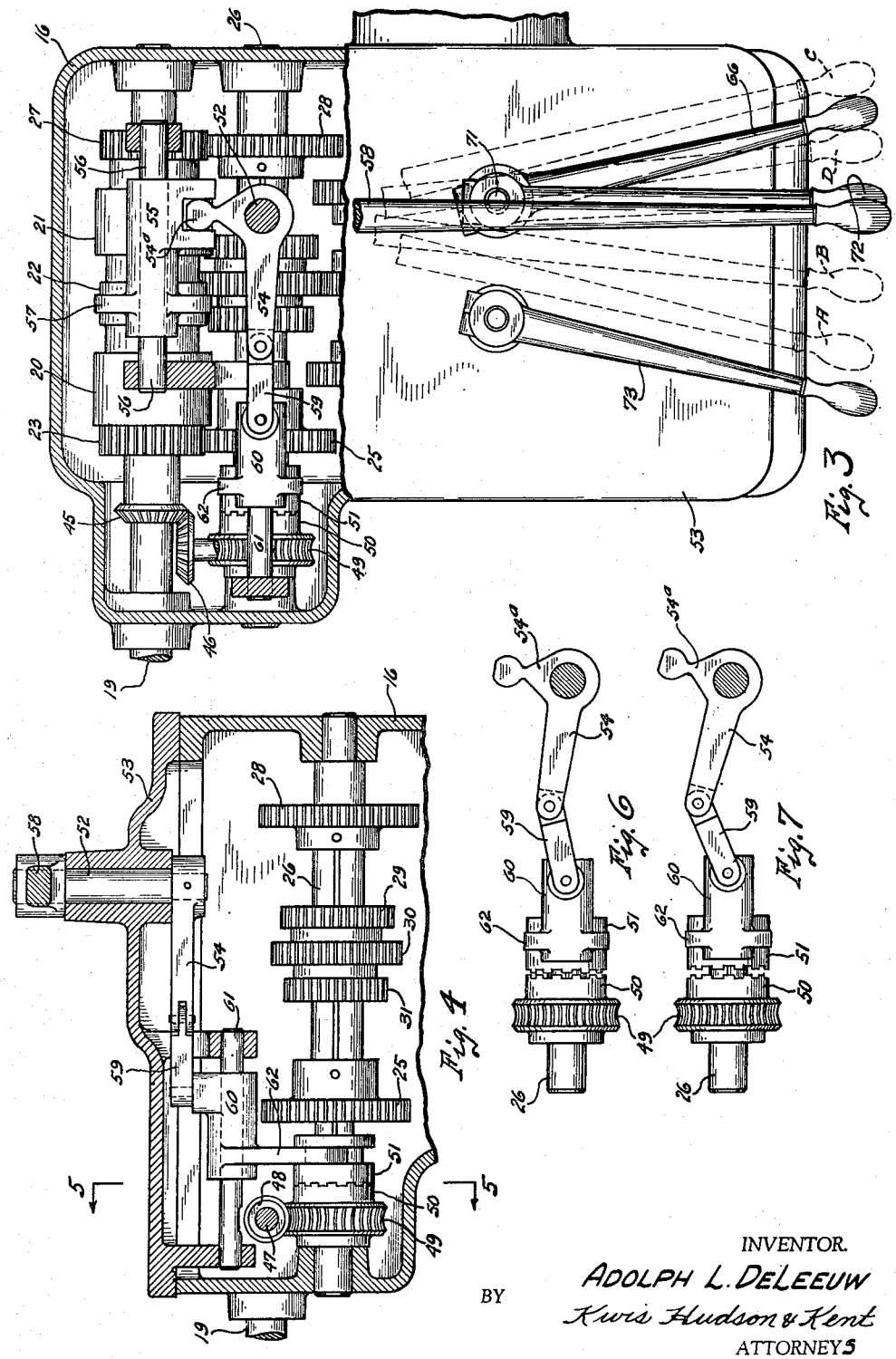
INVENTOR.
ADOLPH L. DeLEEUW
BY Kwis Hudson & Kent
ATTORNEYS Patented Aug. 15, 1939

2,169,761

UNITED STATES PATENT OFFICE 2,169,761

CHANGE SPEED MECHANISM FOR MACHINE TOOLS

Adolph L. De Leeuw, Plainfield, N. J., assignor to The Warner & Swasey Company, Cleveland, Ohio, a corporation of Ohio Application November 20, 1936, Serial No. 111,830

12 Claims. (Cl. 82—29)

This invention relates to a machine tool and although it may be applied to various types of machine tools having change speed gearing, it will be described herein by way of illustration as applied to the head stock of a lathe.

An object of the invention is to provide in a machine tool having a part to be moved at different rates and change speed gearing for changing the rate of movement of said part, means for facilitating the shifting of said change speed gearing to vary the rate of said part.

Another object is to provide, in association with the change speed gearing forming the drive for a movable part of a machine tool, means whereby when said gearing is shifted it can be readily intermeshed without clashing.

Another object is to provide in a machine tool having a movable part and change speed gearing for changing the rate of movement of said part, means for effecting a slow power-driven movement of said change speed gearing preparatory to the shifting of said change speed gearing to change the speed of said part.

Another object is to provide in a machine tool having a movable part, change speed gearing for moving said part at different rates, and means for starting, stopping or reversing the movement of said part and including a movable control member, means for effecting a slow power driven movement of said change speed gearing preparatory to shifting said gearing and effective for both forward and reverse operations of said part to eliminate gear clashing during shifting of the gears.

Another object is to provide in a machine tool having a movable part, change speed gearing for moving said part at different rates and means for starting, stopping or reversing the movement of said part together with means for effecting a slow power driven movement for said change speed gearing, both of said means being controlled by a common control member.

Further and additional objects and advantages not hereinbefore referred to will become apparent hereinafter during the detailed description which is to follow of an embodiment of the invention.

Referring to the accompanying drawings,

Fig. 1 is a transverse sectional view through the head stock of a machine tool and is taken substantially on irregular line 1—1 of Fig. 2 looking in the direction of the arrows.

Fig. 2 is a developed view of the change speed gearing and driving mechanism for the work spindle of the head stock of the machine tool shown in Fig. 1.

Fig. 3 is a top plan view of the head stock of the machine tool with a portion of the cover broken away and with certain portions thereof extending downwardly from the cover shown in section, the section being taken substantially on line 3—3 of Fig. 1 looking in the direction of the arrows.

Fig. 4 is a fragmentary sectional view taken substantially on line 4—4 of Fig. 1 looking in the direction of the arrows.

Fig. 5 is a sectional view taken substantially on line 5—5 of either Fig. 2 or Fig. 4 looking in the direction of the arrows.

Fig. 6 is a detached view of the slow power clutch mechanism and its operating means, with the parts shown in the position they occupy prior to the main drive clutch being engaged for forward movement.

Fig. 7 is a view similar to Fig. 6 which shows the relationship of the parts after the main drive clutch has been fully engaged for forward drive.

Fig. 8 is a view similar to Fig. 6 and shows the relationship of the parts prior to the main drive clutch being engaged for reverse drive, and Fig. 9 is a view similar to Fig. 7 but shows the parts after the main drive clutch has been engaged for reverse drive.

In Fig. 1 a portion of a lathe is shown and comprises a bed 15 at one end of which is located the head stock 16. A work spindle 17 is rotatably supported in the head stock and is adapted to be driven at a plurality of speeds by means of change speed gearing which will now be described.

Referring to Fig. 2 wherein the change speed gearing is illustrated in a developed view, it will be seen that a pulley 18 is secured to the main drive shaft 19 and that said pulley can be connected to any suitable source of power. Freely rotatable on but fixed axially with respect to the drive shaft 19 in spaced relation are clutch members 20 and 21 while intermediate said clutch members is a shiftable clutch member 22 that is splined to the shaft to rotate therewith and move axially thereof. The clutch formed by the members 20, 21 and 22 is arranged so that the shiftable clutch member 22 can be moved a short distance from neutral toward either the member 20 or the member 21 before it comes into clutching engagement with said members for a purpose later to be explained.

Clutch member 20 has formed thereon a gear 23 which meshes with an idler gear 24 that in turn meshes with a gear 25 pinned to a shaft 26. The clutch member 21 has formed thereon a gear 27 which constantly meshes with a gear 28 also fixed to the shaft 26. It will be seen that the shaft 26 will be driven by the shaft 19 in either the forward or reverse directions through the gearing just referred to and dependent upon the engagement of the main drive clutch.

A three-step gear cone formed of the gears 29, 30 and 31 is splined on the shaft 26 intermediate the gears 25 and 28 for rotation therewith but movement axially thereof and the gears 29, 30 and 31 are adapted to mesh respectively with gears 32, 33 and 34 fixed to a shaft 35 from which it will be noted that the shaft 35 can be driven at any one of three speeds in either the forward or reverse directions.

The gear 34 is constantly in mesh with a gear 36 formed on a sleeve 36a that is freely rotatable on the spindle 17 but held against axial movement thereon. The sleeve 36a is also provided with a gear 37 located adjacent the opposite end of the sleeve from the gear 36 and said gears 36 and 37 are adapted to mesh respectively with gears 38 and 39 of a rear two-step gear cone that is splined to a shaft 40 for rotation therewith and movement endwise thereof. It will be seen that the shaft 40 can be driven at any one of six speeds in either the forward or reverse directions.

The shaft 40 also has splined thereto a front two-step gear cone formed of the gears 41 and 42, with the gear 41 adapted to be brought into mesh with a gear 43 fixed to the spindle 17 while the gear 42 can be intermeshed with a gear 44 also fixed to the spindle, wherefore, it will be seen that the spindle 17 can be driven from the main drive shaft 19 at any one of twelve speeds in either the forward or reverse directions.

The shaft 26 can also be driven from the shaft 19 but at a considerably slower speed by mechanism which will now be described. A beveled gear 45 is fixed to the shaft 19 and meshes with another beveled gear 46 fixed to a short shaft 47 that is rotatably supported in the head stock. The shaft 47 has fixed thereto intermediate its ends a worm 48 that meshes with a worm wheel 49 mounted on or formed integral with a clutch member 50 that is freely rotatable on but held against endwise movement with respect to the shaft 26.

A shiftable clutch member 51 is splined to the shaft 26 for movement endwise thereof and for rotation therewith. The clutch members 50 and 51 constitute an auxiliary clutch and are provided on their adjacent faces with clutch teeth, wherefore when said teeth are interengaged by shifting the clutch member 51 toward the clutch member 50 a relatively slow drive will be imparted from the shaft 19 through the gearing 45, 46, 48 and 49 to the shaft 26 and the change speed gearing.

In order to obtain the objects of the invention, the main driving clutch on the shaft 19 and the auxiliary clutch formed of the members 50 and 51 on the shaft 26 are preferably controlled by a common control member, but in any event are so controlled that the main driving clutch can never be engaged when the auxiliary clutch members are engaged and vice versa.

A vertically extending shaft 52 is rotatably supported in a boss formed on the cover 53 of the head stock and has fixed to its lower end a bell crank lever having a long arm 54 and a short arm 54a provided with a rounded end. The rounded end of the short arm 54a of the bell crank lever extends into a slot formed in a sleeve 55 that is slidably supported on a rod 56 carried by downward extensions formed on the under side of the cover 53. The sleeve 55 is provided with an integral downwardly extending yoke 57 that straddles the groove in the shiftable clutch member 22 of the main driving clutch (see Figs. 1 and 3), wherefore, it will be seen that when the shaft 52 is rocked by moving the control lever 58 fixed to the upper end of the shaft that said clutch member 22 can be moved into engagement with the clutch members 20 and 21, as the case may be, for reverse or forward drive or can be shifted into a middle or disengaged position with respect to said clutch members.

The long arm 54 of the bell crank lever that is fixed to the shaft 52 has pivotally connected to its outer end a link 59 which in turn is pivotally connected to a sleeve 60 that slides on a rod 61 supported on downwardly extending portions formed on the under side of the head stock cover 53, the link 59 and long arm 54 forming a toggle connection. The sleeve 60 has as an integral part thereof a downwardly extending yoke 62 which straddles the groove in the shiftable clutch member 51 of the auxiliary clutch, see Fig. 4. It will be apparent that rotation of the shaft 52 also acts through the toggle connection to the sleeve 60 to move the shiftable clutch member 51 into and out of engagement with the clutch member 50.

It will be recalled that reference was previously made herein to the fact that the shiftable clutch member 22 of the main driving clutch could move a short distance from its middle or neutral position in each direction before it engaged with either the clutch members 20 or 21. Conversely the shiftable clutch member 22 will be disengaged from the clutch members 20 and 21 before it reaches its middle or neutral position, and it is during this period between its disengagement and its reaching middle or neutral position that the movable clutch member 51 is brought into clutching engagement with the clutch member 50 to impart a relatively slow drive to the shaft 26 and the change speed gearing.

Reference to Fig. 3 will show that the shiftable clutch member 22 of the main driving clutch is in a midway position while the clutch member 51 is in clutching engagement with clutch member 50 of the auxiliary clutch, it being noted that the lever 58 is in center position as shown in full lines. At this time a relatively slow drive is being imparted to the shaft 26 and to the change speed gearing, wherefore the operator may shift the different shiftable gear cone member of the change speed gearing as desired and the gears will intermesh easily and without clashing due to the slow rotation thereof.

Assuming the gear cones to have been shifted, the operator moves the lever 58 toward the left, as viewed in Fig. 3, and into dotted line position A to effect an engagement of the main drive clutch for forward drive. When the lever 58 moves from the middle or full line position, as viewed in Fig. 3 to dotted line position A, i. e. the most left hand dotted line position, the shiftable clutch member 22 of the main driving clutch has been engaged with clutch member 21 while the shiftable clutch member 51 of the auxiliary clutch has been moved to a disengaged position with respect to clutch member 50, that is, to the position shown in Fig. 7. The drive to the work spindle 17 is now through the main driving clutch and change speed gearing at the newly obtained speed.

When the operator desires to change the speed of the spindle 17 he first moves the control lever 58 from dotted line position A toward the full line or middle position as shown in Fig. 3. This movement of the control lever acts to first disengage the main driving clutch at approximately the time when the control lever 58 reaches dotted line position B, as shown in Fig. 3, at which time the shiftable clutch member 51 of the auxiliary has moved almost into an engaged position with the clutch member 50 as shown in Fig. 6. The continuation of the movement of the control lever 58 from position B to full line or middle position causes the full engagement of the clutch members 51 and 50 of the auxiliary clutch and the slow drive to the change speed gearing is again initiated while the shiftable clutch member 22 of the main drive clutch moves into its middle or neutral position. The operator can now shift the shiftable gear cones to obtain the desired speed for the spindle 17 after which the control lever 58 can be moved from the full line position to dotted line position A to again effect an engagement of the main drive clutch in the forward direction and a disengagement of the clutch members 50 and 51 of the auxiliary if the cycle of operation of the machine is to be continued. However, if it is desired to stop the operation of the machine before shifting to a different speed, for the purpose of loading or unloading the work piece, the operator moves the control lever 58 from dotted line position A as shown in Fig. 3 to dotted line position B at which time both main drive clutch and the auxiliary clutch will be disengaged. It will be understood that the same operation will be carried out when a reverse drive is being imparted to the spindle 17 and that the control lever 58 will be moved to dotted line positions C and D which correspond respectively with positions A and B for the forward drive. It will be noted, however, that during the reverse operation of the machine, the slow drive will continue to be in the forward direction.

The shiftable gear cones can be shifted by any desired means but by way of example the following arrangement is illustrated herein. The forward two-step gear cone on the shaft 40 and formed of the gears 41 and 42, is shifted by means of a shoe 63 straddling the gear 42 and swivelly carried by the outer end of an arm 64 that is fixed to the lower end of a rockable sleeve 65 rotatably mounted in a boss formed on the cover 53. The upper end of said sleeve 65 has secured thereto an operating lever 66.

The three-step gear cone on the shaft 26 formed of the gears 29, 30 and 31 is shifted by means of a shoe 67 that straddles the gear 30 and is carried by a slidable sleeve 68 mounted on a rod 69 arranged in suitable downwardly extending portions on the under side of cover 53 as will be well understood. An arm 70 is fixed to the lower end of a vertically extending shaft 71 arranged within the sleeve 65 and rotatable relative thereto, and said arm 70 extends into a slot formed on the sleeve 68, wherefore, when the shaft 71 is rocked the arm 70 will impart sliding movement to the sleeve 68 to shift the three-step gear cone. An operating lever 72 is secured to the upper end of shaft 71 and extends toward the forward side of the machine as is clearly shown in Figs. 1 and 3.

The rear two-step gear cone on the shaft 40 may be shifted similarly to the front two-step gear cone by shifting mechanism that is operated by the operating lever 73 as shown in Fig. 3.

From the foregoing description it will be seen that the shifting of the shiftable gear cones is facilitated and the gears of the change speed gearing brought into mesh without clashing and interference by imparting to the gear train a relatively slow positive drive at the time of shifting and in a forward direction. It will further be noted that the construction is such that the main driving clutch is interconnected with the auxiliary clutch and is controlled by a common control member, wherefore, only one or the other of the clutches can be engaged at a time. It will also be noted that the auxiliary clutch will be effective during both forward and reverse operations of the machine but that during the reverse operation of the machine the slow drive continues to be initiated in the forward direction.

Having thus described my invention, I claim:

1. In a machine tool having a part to be moved at different rates and a substantially constant speed power source, change speed means for varying the rate of movement of said part, means for connecting and disconnecting said power source and said change speed means, a control member for said connecting and disconnecting means, and an auxiliary means for connecting and disconnecting said power source and said change speed means for imparting to the latter an additional relatively slow power drive to facilitate the shifting thereof, said control member being operatively connected to and controlling said auxiliary means.

2. In machine tool having a part to be moved in opposite directions and a substantially constant speed power source, change speed means for varying the rate of movement of said part in both directions, means for connecting and disconnecting said power source and said change speed means, a control member for said connecting and disconnecting means, and a secondary means for connecting and disconnecting said power source and said change speed means to impart to the latter an additional relatively slow rate of movement to facilitate the shifting thereof, said control member being operatively connected to and controlling said auxiliary means.

3. In a machine tool, a movable part, change speed means for moving said part, power means, means for connecting and disconnecting said power means and said change speed means to move said part at different normal working speeds, a control member for said connecting and disconnecting means, auxiliary means for connecting and disconnecting said power means and said change speed means for driving the latter at a relatively slow non-working speed to facilitate the shifting of the change speed means, said control member being operatively connected with and controlling said auxiliary means, said connecting means and said auxiliary means being operatively interlocked so that only one or the other will be active at a time.

4. In a machine tool having a spindle to be rotated in opposite directions and a substantially constant speed power source, change speed gearing for varying the speed of said spindle, means for connecting and disconnecting said power source and said change speed gearing to impart to said spindle a plurality of different working speeds in opposite directions, a control member for said means, auxilary means for connecting and disconnecting said power source and said change speed gearing to drive the latter at a relatively slow speed to facilitate the shifting thereof, said control member being operatively connected with and controlling said auxiliary means, and means forming an interlock between said connecting means and said auxiliary means whereby only one of said means can be active at a time.

5. In a machine tool having a part to be moved and a substantially constant speed power source, change speed gearing for varying the rate of movement of said part, a clutch for connecting and disconnecting said power source and said change speed gearing to impart to said part different rates of movement, and an auxiliary clutch for connecting and disconnecting said power source and said change speed gearing to impart to the latter a relatively slow rate of movement, and a single control member operatively connected to both of said clutches for effecting both the connection and disconnection of the power source with both of said clutches.

6. In a machine tool having a part to be moved and a substantially constant speed power source, change speed gearing for varying the rate of movement of said part, a clutch for connecting said change speed gearing and said power source for imparting a plurality of different rates of movement to said part, an auxiliary clutch for connecting said power source to said change speed gearing to impart to the latter a relatively slow rate of movement to facilitate the shifing thereof, and interlocking mechanism operatively connected with both of said clutches and including a single control member whereby only one or the other clutch can be engaged at a time while both clutches may be disengaged at one time.

7. In a machine tool having a part to be moved and a substantially constant speed power source, change speed gearing for moving said part at different rates of movement, a clutch for connecting said change speed gearing and said power source, an auxiliary clutch for connecting said power source and said change speed gearing to impart a relatively slow movement to the latter to facilitate the shifting thereof, interlocking mechanism between said clutches for controlling the same and including a single control member and means whereby when said control member is located in one or the other of two predetermined positions either said first named clutch or said auxiliary clutch will be engaged and when said control member is located in an intermediate position both of said clutches will be disengaged.

8. In a machine tool having a part to be moved and a substantially constant speed power source, change speed gearing for moving said part at different rates, a clutch for connecting said change speed gearing and said power source, an auxiliary clutch for connecting said change speed gearing and said power source to impart to said gearing a relatively slow movement to facilitate the shifting thereof, a common control means for both of said clutches and including a toggle operatively connecting said means with said auxiliary clutch.

9. In a machine tool having a part to be moved in opposite directions and a substantially constant speed power source, change speed gearing for moving said part at different rates, a clutch for connecting said power source and said change speed gearing for driving the latter and moving said part in both forward and reverse directions, an auxiliary clutch for connecting said power source to said change speed gearing to drive the latter at a relatively slow rate to facilitate the shifting thereof, and a common means for controlling said clutches and including a member movable to one or the other of two extreme positions of movement at which time said first named clutch is engaged for forward or reverse movement of said part and said auxiliary clutch is disengaged or movable to a middle position at which time said auxiliary clutch is engaged and said first named clutch is disengaged or movable to positions intermediate said middle position and said extreme positions at which times both of said clutches are disengaged.

10. In a machine tool having a part to be moved at different rates of movements and a substantially constant speed power source, change speed gearing for moving said part, a gear train including a clutch for connecting said power source and said change speed gearing to drive the latter and said part at relatively fast speeds, and an auxiliary gear train including a worm and a worm wheel and a clutch for connecting said power source and said change speed gearing to drive the latter at a relatively slow speed during that portion of the shifting of the change speed gearing that brings the same into intermeshing driving relationship to facilitate the shifting thereof.

11. In a machine tool having a part to be moved and a substantially constant speed power source, change speed means for varying the rate of movement of said part, control means for said change speed means for shifting the latter, means for imparting a relatively slow power drive to said change speed means, and means for controlling the last named means, said control means for said change speed means functioning independently of the last named control means.

12. In a machine tool having a part to be moved at different rates and a substantially constant speed power source, change speed means for varying the rate of movement of said part, a control member for said change speed means, means for connecting and disconnecting said power source and said change speed means, an auxiliary means for connecting and disconnecting said power source and said change means for imparting to the latter an additional relatively slow power drive to facilitate the shifting thereof, and a control member operatively connected with both of said connecting and disconnecting means for controlling the same independently of said first named control member.

ADOLPH L. DE LEEUW.